(12) United States Patent
Aaron et al.

(10) Patent No.: US 6,864,782 B1
(45) Date of Patent: Mar. 8, 2005

(54) BACKUP AID SYSTEM AND METHOD FOR DETECTING THE PRESENCE OF A TRAILER ATTACHED THERETO

(75) Inventors: Mark Christian Aaron, Canton, MI (US); Peter Langer, Lexington, MI (US); Robert Kwiecinski, Saline, MI (US)

(73) Assignee: Ford Global Technologies, LLC, Dearborn ( * ) Notice: Subject to any disclaimer, the term of this patent is extended or adjusted under 35 U.S.C. 154(b) by 138 days.

(21) Appl. No.: 10/064,976

(22) Filed: Sep. 5, 2002

(51) Int. Cl.[7] .............................................. G08B 21/00
(52) U.S. Cl. ........................ 340/431; 340/435; 340/903
(58) Field of Search ................................ 340/431, 458, 340/641, 642, 456, 435, 436, 468, 463, 932.2, 903; 324/504, 503; 307/10.1, 10.8; 342/70; 180/167, 271

(56) References Cited

U.S. PATENT DOCUMENTS

| | | | |
|---|---|---|---|
| 3,593,274 A | 7/1971 | Krugler | |
| 3,840,852 A | 10/1974 | Schwellenbach | |
| 3,965,456 A | 6/1976 | Schwellenbach | |
| 4,195,281 A | 3/1980 | Bell | |
| 4,430,637 A * | 2/1984 | Koch-Ducker et al. | 340/431 |
| 5,030,938 A | 7/1991 | Bondzeit | |
| 5,754,123 A * | 5/1998 | Nashif et al. | 340/903 |
| 5,805,061 A * | 9/1998 | Fritz et al. | 340/471 |
| 6,218,952 B1 | 4/2001 | Borland et al. | |
| 2003/0098785 A1 * | 5/2003 | Bishop | 340/431 |

* cited by examiner

Primary Examiner—Jeffery Hofsass
Assistant Examiner—Eric Blount
(74) Attorney, Agent, or Firm—Carlos L. Hanze

(57) ABSTRACT

A backup aid system (14) for detecting the presence of a trailer (12) includes a trailer connector (52a) and a backup aid controller (50) that has an input (66) electrically coupled to the connector (52a). The backup aid controller (50) monitors a voltage level at input (66). When the voltage level is above a first predetermined voltage, the controller (50) generates a backup warning signal. When the voltage is below a second predetermined voltage, the controller (50) disables the backup warning signal. Also, the system may monitor the voltage in between the first predetermined voltage and the second predetermined voltage to determine the presence of a lamp fault such as outage or corroded contacts.

13 Claims, 3 Drawing Sheets

BACKUP AID SYSTEM AND METHOD FOR DETECTING THE PRESENCE OF A TRAILER ATTACHED THERETO

BACKGROUND OF INVENTION

The present invention relates generally to a backup aid detection system for automotive vehicles, and more particularly, to a system that disables the backup-aid detection when a trailer is being pulled by the vehicle.

Backup aid detection systems are becoming common on large vehicles such as sport utility vehicles and large sedans. Backup aid detection systems typically employ several sensors positioned typically on the back bumper of the vehicle that generate a signal to sense the presence of an object. Typically, ultrasonic detectors are used but other types of detectors such as radar-based may also be used.

Sport utilities, in particular, are commonly used to tow trailers. When backing up, the backup aid system detects the trailer and triggers a warning within the vehicle. Consequently, most manufacturers of vehicles having such systems provide a disable switch within the vehicle to prevent the backup aid warning when towing a trailer. Manually depressing a switch may provide some annoyance to drivers and the switch provides an additional cost in the system. It is desirable to reduce costs and enhance customer convenience in automotive vehicles. Therefore, it would be desirable to provide a backup aid warning system that automatically detects the presence of a trailer and disables the warning.

SUMMARY OF INVENTION

In one aspect of the invention, a backup aid circuit for detecting the presence of a trailer includes an electrical connector and a backup aid controller having an input electrically coupled to the connector. The backup aid controller monitors the voltage level at the input and when the voltage level is above a first predetermined voltage, generates a backup warning signal. When the voltage is below a predetermined voltage, the backup aid controller disables the backup warning signal.

In a further aspect of the invention, a method for operating a backup aid circuit comprises monitoring an input voltage at an input to a back up aid controller; when the input voltage is above a first predetermined voltage, generating a backup warning signal; and when the input voltage is below a second predetermined voltage, disabling a backup warning signal.

One advantage of the invention is that the system may also be adapted to determine if the trailer tail lamps are functioning properly. In addition, the present invention may also be tailored to not only detect if the trailer lamps are functioning but to detect intermittent functioning such as a corroded contact which loses electrical integrity from time to time as detected by the module software.

Yet another advantage of the invention is that the system is easily implemented in current backup aid systems while reducing the cost of such systems by eliminating the switch.

Other objects and features of the present invention will become apparent when viewed in light of the detailed description of the preferred embodiment when taken in conjunction with the attached drawings and appended claims.

DETAILED DESCRIPTION

Figure 1:
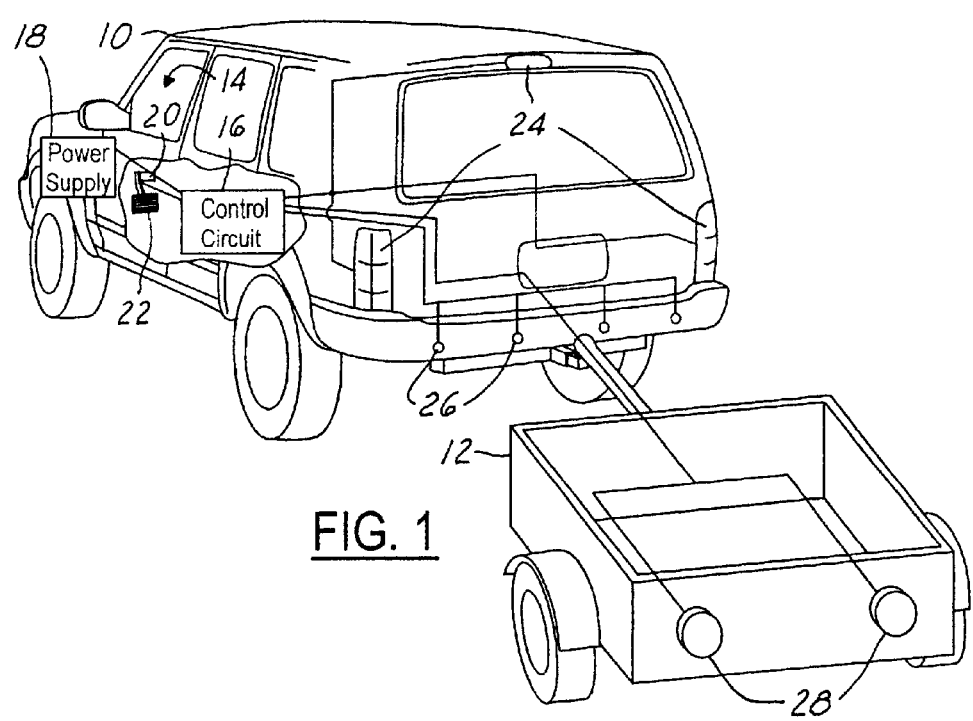
FIG. 1 is a perspective view of an automotive vehicle having a backup aid system according to the present invention.

In the following description, the same reference numerals will be used to identify the same components in the various views. While the present invention is described with specific embodiments, various alternatives will be evident to those skilled in the art. For example, various types of switches may be used to replace the relay switch described below. One such embodiment would be an electrical diode with the anode connected at node N1 and the cathode connected at circuit 49. Another embodiment would be a metal oxide field effect transistor (MOSFET) configured as a source follower with the Drain connected to node N1, and with the Source connected to circuit 49. The Gate of the MOSFET would also be connected through a charge pump to node N1.

Referring now to FIG. 1, an automotive vehicle 10 is illustrated connected to a trailer 12. While automotive vehicle 10 is shown as a sport-utility vehicle, the present invention is applicable to various types of vehicles suitable for pulling trailers.

Automotive vehicle 10 has a backup aid system 14. Back-up aid system 14 has a control circuit 16 that is coupled to a power supply 18 such as the battery of the vehicle. Control circuit 16 is also coupled to a switch 20 operably coupled to brake pedal 22.

Control circuit 16 is coupled to brake lights 24 which may include a center high mount stop light. Sensors 26 are used for detecting the presence of an object behind the vehicle. Sensors 26 may be various types of sensors including ultrasonic or laser-based systems. In addition, control circuit 16 is also electrically coupled through item 40 (FIG. 2) to trailer brake lights 28.

Figure 2:
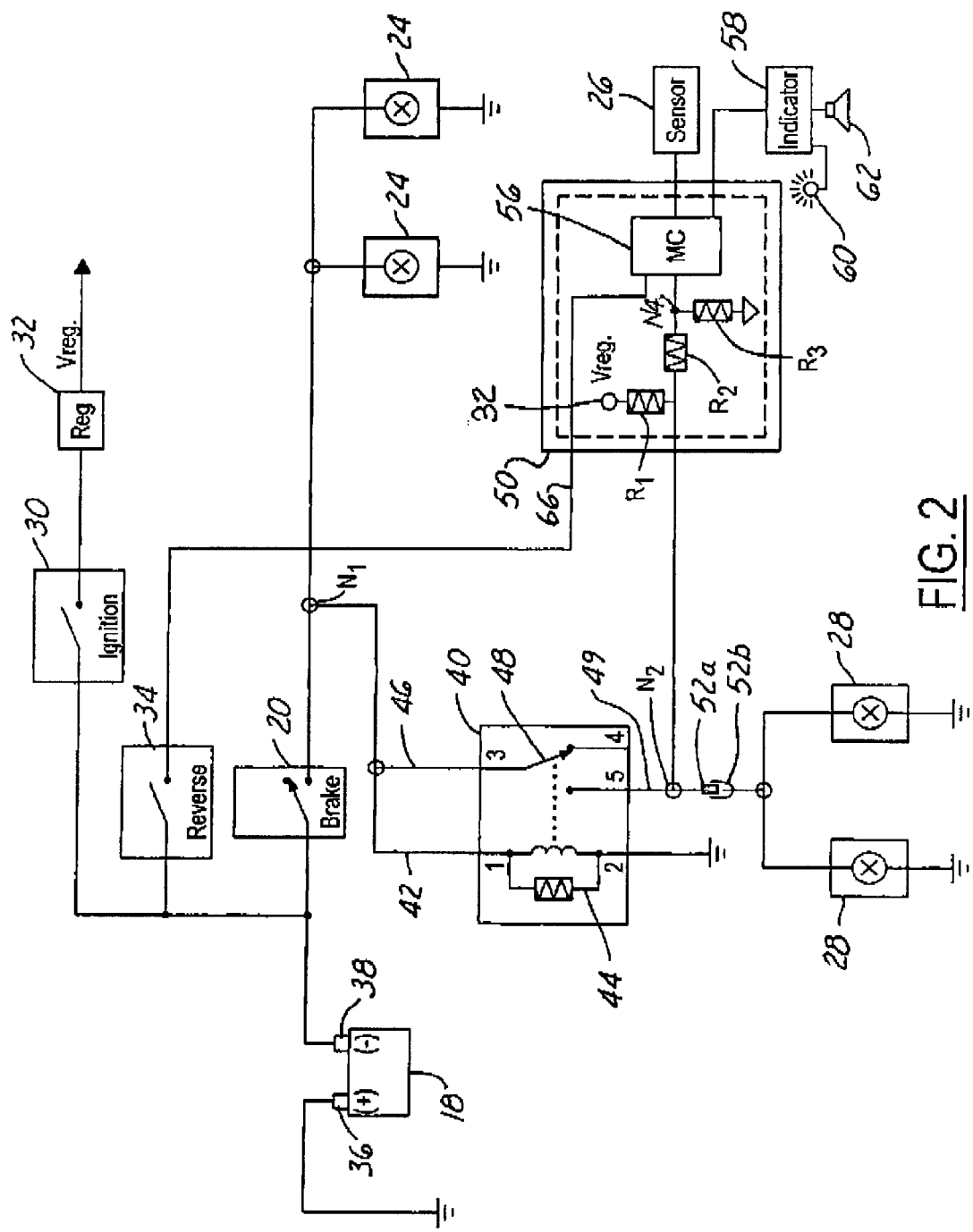
FIG. 2 is a schematic view of a backup aid system according to the present invention.

Referring now to FIG. 2, the schematic view of the backup aid system 14 is illustrated. An ignition switch circuit 30 generating an engine-in-run signal provides power to the back up system. The ignition switch 30 provides a regulated voltage to the system through a voltage regulator 32. The reverse switch from the transmission enables the back up aid system and more particularly the operation of back up aid controller 50 described below. Backup aid system 14 includes power supply 18, which is preferably the vehicle power supply, typically a battery. The power supply 18 has a negative terminal 36 coupled to ground and a positive terminal 38. Positive terminal 38 is electrically coupled to brake switch 20, ignition switch 30, and reverse switch 32. Brake switch 20 closes when the brake pedal is depressed. Brake switch 20 is electrically coupled to a first node $N_1$. Node $N_1$ is coupled to vehicle brake lamps 24 that have the other terminal coupled to ground. Node $N_1$ is also coupled to a switch circuit 40. As illustrated, switch circuit 40 is a relay having a first terminal 42 coupled to a solenoid 44 within switch circuit 40. Solenoid 44 is also coupled to ground. Switch circuit 40 has a second terminal 46 that is coupled to the solenoid-operated switch 48. The solenoid-operated switch 48 is open when brake switch is deactivated and closed when brake switch 20 is closed. The output 49 of solenoid operated switch 48 is coupled to a second node $N_2$. Node $N_2$ is also coupled to a backup aid controller 50 and a first portion of a trailer connector 52a. Trailer connector also has a second portion 52b electrically coupled to trailer lamps 28.

Backup aid controller 50 has a microcontroller 56. Microcontroller 56 is coupled to sensors 26 and an indicator 58.

Microcontroller 56 is also coupled to a transmission input (reverse switch 34) and is powered by voltage regulator 32, contained within the controller 50 that is connected to an ignition switch 30. Indicator 58 may include an LED or light display 60 and/or an audible display 62. Audible display may for example, comprise a speaker or the like.

Controller 50 includes a resistor $R_1$ coupled to node $N_2$ and to a regulated voltage source $V_{reg}$. Controller 50 may also include a second resistor $R_2$ that is coupled between node $N_2$ and an input 66 of microcontroller 56. A third resistor $R_3$ is coupled to input 66 of microcontroller 56. A common node $N_4$ is formed between resistor $R_2$, $R_3$, and microcontroller 56 at input 66. In one constructed embodiment, $R_1$, $R_2$, and $R_3$ were 3K, 22K and 100K, ohms, respectively. It should be noted that $R_1$ is referred to as a pull-up resistor and, in combination with the load of trailer lamps 28, forms a voltage divider with the load of the trailer lamps when trailer connector 52a and 52b are coupled together. Thus, the voltage at node $N_2$ varies between a high voltage (first threshold) when the brakes are applied, a low voltage when a trailer is coupled at electrical connector 52b and a medium voltage between the high and low voltages when no trailer is attached at 52b or both trailer lights are out. Microcontroller 56 thus senses the voltage at input 66 to determine the presence of a trailer and disable or enable the backup warning signal that is manifested through indicator 58. It should also be noted that a poor or corroded connection at trailer connectors 52a or 52b or burned out bulb or bulbs of trailer lamps 28 may cause the voltage at input 66 to increase above a first threshold over which the presence of a trailer is determined. Thus, a third threshold corresponding to a between voltage may be used to indicate the presence of a lamp outage so that corrective measures may be taken. Thus, when the sensed voltage at input 66 is below a third predetermined voltage but above the second predetermined voltage, the microcontroller may generate a lamp outage signal through indicator 58 as will be described below.

Figure 3:
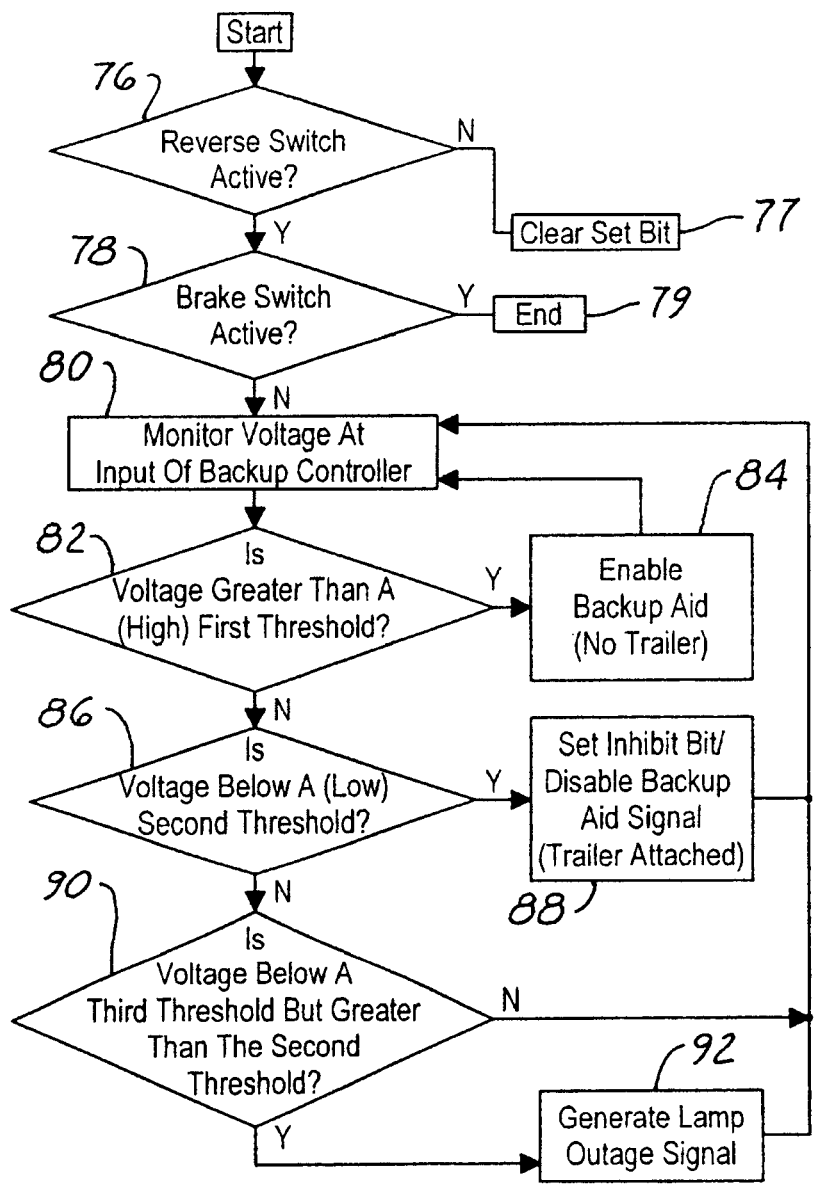
FIG. 3 is a flow chart of the operation of the backup aid system according to the present invention.

Referring now to FIG. 3, the process according to the present invention is illustrated. In step 76 the reverse switch is monitored. When the reverse switch is not activated the set bit is cleared in step 77. In step 76 when the reverse switch is activated, step 78 is executed by testing for brake switch activation. This is indicated by the presence of a voltage corresponding to a value near vehicle battery voltage level. If brake activation is tested, no additional measurements can be made and the subroutine is ended in step 79. If no brake switch activation is detected, step 80 is executed. In step 80 the voltage at input 66 of the microcontroller 56 is monitored. In step 82 when the voltage is greater than a first threshold the backup aid is enabled allowing the backup signal to be heard within the vehicle. When the voltage is greater than the first threshold, no trailer connector and thus no trailer is present behind the vehicle. The backup signal is enabled in step 84. After step 84, step 80 is again performed. In step 82, when the voltage is not greater than the first threshold, step 86 is executed in which the voltage at input 66 is compared to a second threshold. When the input voltage is lower than the second threshold, this indicates a trailer is present and at least one lamp is operating and thus the backup aid signal is disabled in step 88. After step 88, step 80 is again executed. Referring back to step 86, when the voltage is not below a second threshold step 90 is executed. In step 90 the voltage is compared to a third threshold that is greater than the second threshold but lower than the first threshold. When the voltage is at or below the third threshold (but greater than the second), a trailer may be present but a fault such as both bulbs out is present. In step 92 a fault signal or a lamp outage signal is generated. After step 92, step 80 is again executed. In step 90 when the voltage at input 66 is not below the third threshold, the system continues to monitor the system at step 80. It should be noted that at any time when the brake switch is active, as indicated in step 78, the previous test cannot be done because the voltage is no different whether or not a trailer is attached. Therefore, the comparison must be done while the brake switch is inactive and the results of the comparison must be retained until the transmission is no longer in reverse.

In one embodiment, the first threshold was set to 9 volts, the second threshold at 3 volts, and the third threshold at 6.8 volts.

While particular embodiments of the invention have been shown and described, numerous variations and alternate embodiments will occur to those skilled in the art. Accordingly, it is intended that the invention be limited only in terms of the appended claims.

What is claimed is:

1. A backup aid circuit for detecting the presence of a trailer connection comprising:

an electrical trailer connector; and a backup aid controller having an input electrically coupled to the connector, said back up aid controller monitoring a voltage level at the input, when the voltage level is above a first predetermined voltage, generating a backup warning signal and when the voltage is below a second predetermined voltage, disabling the backup warning signal.

2. A backup aid circuit as recited in claim 1 further comprising an indicator coupled to the backup aid controller for generating an indicator in response to the backup warning signal.

3. A backup aid circuit as recited in claim 1 wherein when the voltage is below a third predetermined voltage and above the second predetermined voltage, said controller generating a lamp outage signal.

4. A backup aid circuit for detecting the presence of a trailer connection comprising:

a power supply;

a vehicle brake lamp;

a brake switch selectively coupling the power supply to the brake lamp;

a back up aid controller generating a backup warning signal;

a first trailer connector;

a trailer circuit having a trailer lamp and a second connector;

a switch circuit electrically coupled to the brake switch and the brake lamp, said switch circuit having an output node coupled to the back up aid controller and the trailer connector, said output node having a first voltage indicative of the presence of the first trailer connector coupled to the second trailer connector and a second voltage indicative of no second trailer connector; and said backup aid controller disabling the back up warning signal in response to the first voltage.

5. A backup aid circuit as recited in claim 4 wherein the second voltage is greater than the first voltage.

6. A backup aid circuit as recited in claim 4 wherein the switch circuit comprises a relay.

7. A backup aid circuit as recited in claim 4 wherein said back up aid controller generates a lamp outage signal when the output voltage is between the first and second voltage.

8. A backup aid circuit as recited in claim 4 wherein said backup aid controller comprises an input, further comprising a first resistor coupled to the input, said first resistor and said trailer lamp forming a voltage divider coupled to the switch output.

9. A backup aid circuit as recited in claim 4 wherein said switch electrically isolates said vehicle brake lamp from the trailer lamp.

10. A method of operating a backup aid system comprising:
   monitoring an input voltage at an input to a back up aid controller;
   when the input voltage is above a first predetermined voltage, generating a backup warning signal; and
   when the input voltage is below a second predetermined voltage, disabling a backup warning signal.

11. A method as recited in claim 10 further comprising changing the input voltage in response to electrically coupling a trailer to a back up aid controller.

12. A method as recited in claim 10 further comprising when the input voltage is below a third predetermined voltage and above the second predetermined voltage, generating a lamp outage signal.

13. A method as recited in claim 10 further comprising generating an indicator in response to the backup warning signal.

* * * * *